May 29, 1923.
C. T. PENTON
ELECTRIC HEATER FOR FLUIDS
Filed Aug. 17, 1921
1,456,907
2 Sheets-Sheet 2
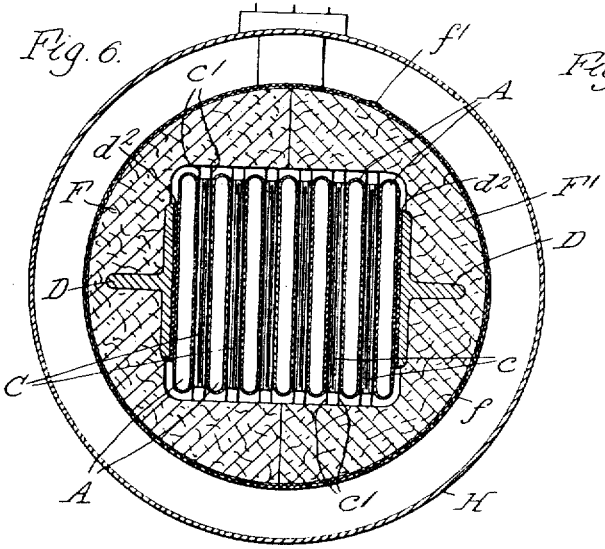
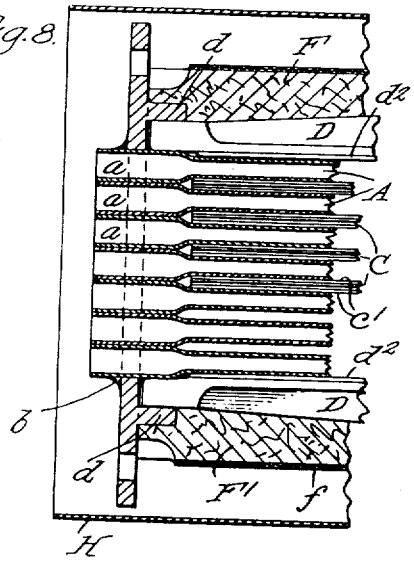
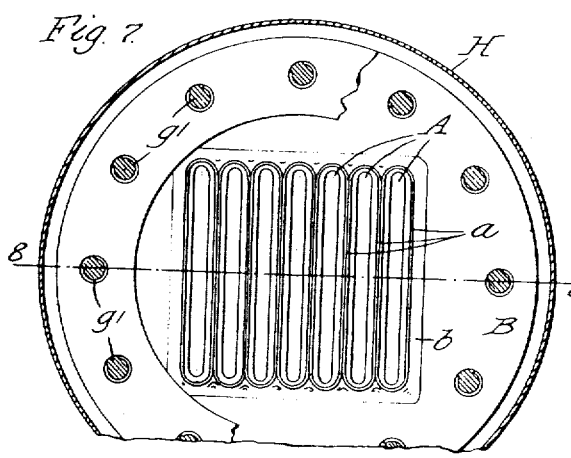
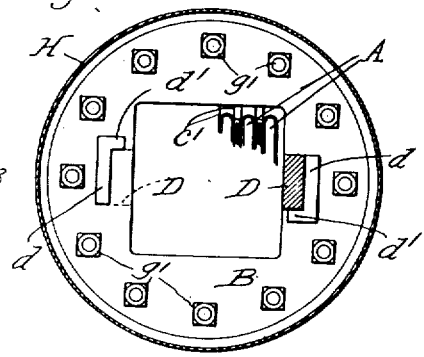
INVENTOR.
Carl T. Penton,
by Parker & Brockwood.
his ATTORNEYS.

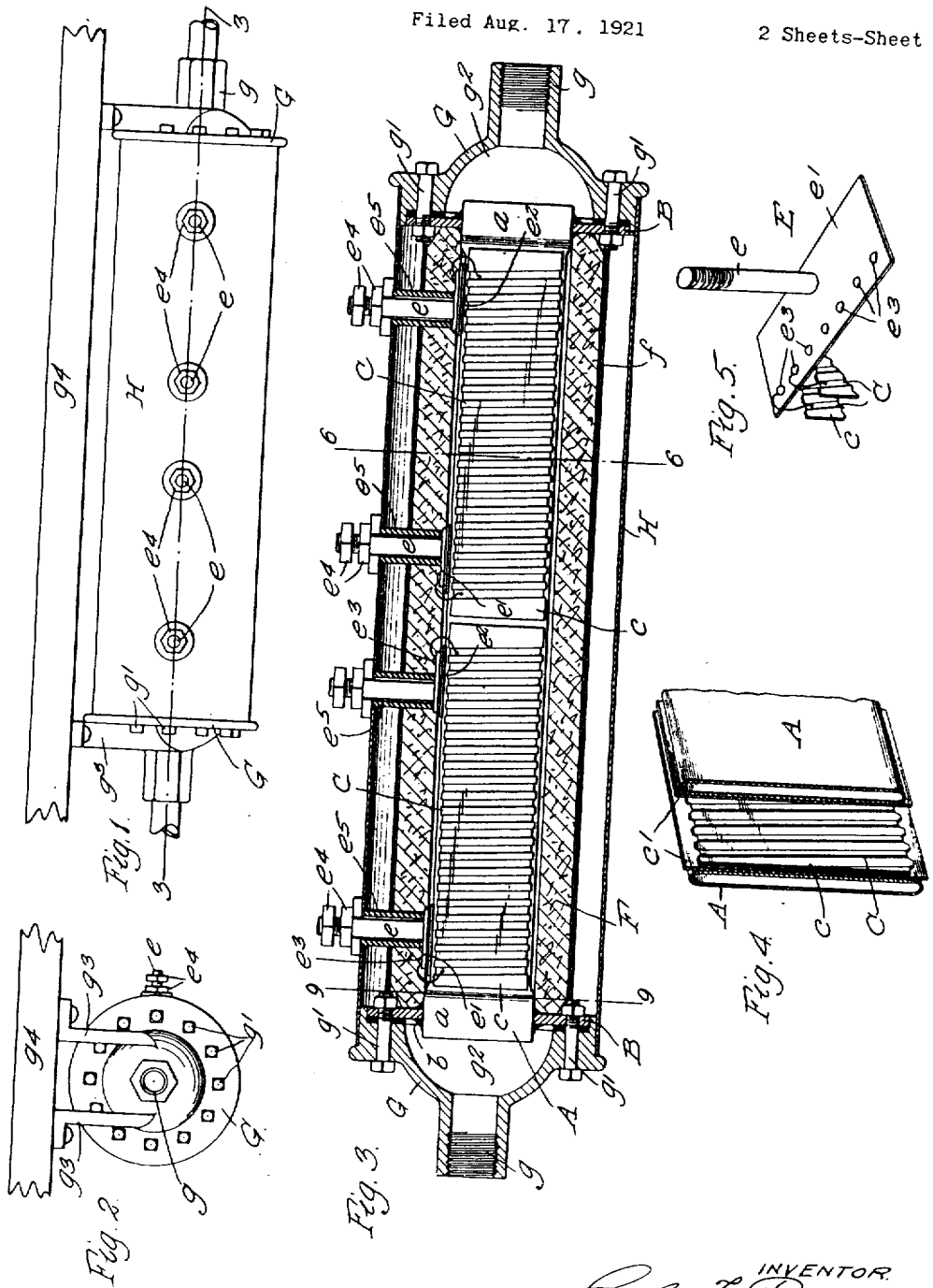

Patented May 29, 1923.

1,456,907

UNITED STATES PATENT OFFICE.

CARL T. PENTON, OF DETROIT, MICHIGAN.

ELECTRIC HEATER FOR FLUIDS.

Application filed August 17, 1921. Serial No. 492,846.

*To all whom it may concern:*

Be it known that I, CARL T. PENTON, a citizen of the United States, residing at Detroit, in the county of Wayne and State of Michigan, have invented a new and useful Improvement in Electric Heaters for Fluids, of which the following is a specification.

This invention relates to electric heaters of the kind adapted to be used for heating fluids, such for example as water, while the same is flowing through the heater.

The objects of this invention are to provide a heater of this kind in which the heating units are readily accessible for repair or inspection; also to provide a heater of this kind which is so constructed that any of the several heating units can be easily removed from the heater and replaced by others, if desired, without disturbing the other heating elements or units; also to construct a heater provided with flat tubes for the fluid to be heated and between which flat heating elements are placed, whereby an efficient use is made of the heat generated; also to provide a heater of this kind with means for holding the tubes against expanding; also to improve the construction of heaters of this kind in other respects hereinafter specified.

In the accompanying drawings:

Fig. 1 is a plan view of a heater embodying the invention.

Fig. 2 is an end elevation thereof.

Fig. 3 is a vertical longitudinal section thereof on an enlarged scale on line 3—3, Fig. 1.

Fig. 4 is a fragmentary perspective view of one of the heating elements arranged between two tubes.

Fig. 5 is a perspective view of a terminal to which the heating elements are connected.

Fig. 6 is a transverse sectional elevation of the heater on an enlarged scale on line 6—6, Fig. 3.

Fig. 7 is a fragmentary end view thereof with the end connecting member removed.

Fig. 8 is a fragmentary sectional plan view thereof on line 8—8, Fig. 7.

Fig. 9 is a sectional elevation thereof on line 9—9, Fig. 3.

Fig. 10 is an elevation of one of the truss members of the heater.

Briefly stated, the heater embodying the invention which is shown in the accompanying drawings, includes a plurality of flat tubes arranged substantially parallel to each other and through which the fluid to be heated flows in a thin layer and which are spaced apart so that suitable heating elements may be interposed between the adjacent flat faces of the tubes. The ends of the tubes are connected to suitable headers which in turn are secured to end members adapted to the connected to a pipe through which the fluid is conducted to and from the heater. The tubes and heating units are enclosed in a readily removable insulating member which when removed makes it possible to easily move any of the heat units out of their operative positions between the tubes, so that the heater can be readily repaired.

A represents the flat tubes through which the fluid to be heated may pass. These tubes in the construction shown, are made of thin material, such for example as copper, and are suitably arranged so that the intermediate portions thereof are spaced apart. In the construction shown, the opposite end of each tube is enlarged as shown at $a$ and the enlarged ends of the tubes are suitably secured to headers B, a water tight connection being formed between the headers and the tubes, preferably by means of a brazed joint $b$ or other suitable means. The arrangement of the tubes described forms spaces between the flat sides of adjacent tubes, into which the heating units or elements may be inserted.

The heating units may be of any suitable or desired construction, those shown consisting of a conductor C wound around a suitable flat insulating and supporting member $c$ which in the construction shown, consists of a thin sheet of mica. The conductor C of each heating unit is held out of contact with the adjacent tubes by means of insulating sheets $c'$, which are also preferably made of mica or other non-inflammable material. By means of the arrangement described, the heating units can readily be inserted into the comparatively small spaces between adjacent tubes and engage substantially throughout the width of the flat sides of the tubes. It is not necessary to provide any means for holding the heating units in place between the tubes since they are frictionally held in their proper positions.

This construction described has the advantage of applying the heat to the current of fluid in such a manner that the current is broken up into relatively thin streams, each of which is heated by means of the heating units interposed between the tubes. Since the tubes are made of relatively thin material, the pressure of the water tends to distort the tubes by pressing the flat sides outwardly and due to this action the sides of the tubes are pressed into engagement with the heating units, thus displacing any air which might otherwise be interposed between the tubes and the heat units and which would hinder the transmission of heat to the fluid. This results in a very efficient use of the heat developed in these units.

In order to prevent the pressure of the water from distorting the outer walls of the outer tubes of the heater, suitable trusses or supporting members are preferably provided which engage these walls and prevent the same from bending outwardly. For this purpose truss members D are used in the construction shown in the drawings, which may, if desired, be of substantially T-shaped cross section to better enable these members to withstand the pressure of the water and these members may be connected with the headers B in any desired manner. In the construction shown for this purpose, the headers are provided with inwardly projecting lugs or parts $d$ with which the truss members D are adapted to engage to hold the same in operative relation to the outer tubes. The projecting portions $d$ are preferably provided with stops or shoulders $d'$ adapted to engage with the edges of the truss members to facilitate the placing of the same in their correct positions. Means of any other suitable kind may be employed for holding the outer sides of the tubes against distortion. $d^2$ represents sheets or layers of heat insulating material which are preferably inserted between the outer tubes and the truss members.

The ends of the conductors C of the heating units may be connected in any desired manner to suitable terminals or connectors through which the necessary electric current may be transmitted to the heating units from the usual supply wires or conductors. In the construction shown for this purpose, each of these terminals consists of a connecting post or stud $e$ having a plate or base $e'$ secured thereon which extends transversely across the edge portions of the tubes A and which is separated therefrom by means of an insulating sheet $e^2$ or the like. The plate or base is provided with a plurality of connectors or the like $e^3$ with which the ends of the conductors C may be connected. The termnal post $e$ is provided with a threaded outer end having the usual nuts or the like $e^4$ for connection with a source of current supply. The connectors $e^3$ may be of any suitable construction, those shown being in the form of rivets which can be readily pressed into a rigid connection with the ends of the conductors C and which may be disconnected from the conductors by cutting the heads of the rivets. The post $e$ of each terminal is preferably surrounded by means of an insulating sleeve or bushing $e^5$. Any other means may be employed for connecting the conductors C of the heating units with a source of current supply.

The tubes A and the heating units are preferably surrounded by means of an insulating covering which confines the heat in such a manner that practically all of the heat from the heating units is transmitted to the fluid flowing through the tubes A. This member is preferably so arranged that it can be readily removed to render the parts of the heater easily accessible. In the construction shown for this purpose, the insulating member is constructed in two parts F and F', the inner faces of which are so formed as to accommodate themselves to the shape of the group of tubes and the truss members D. The insulating members may be of any suitable or desired material and are preferably held together by means of a layer of canvas $f$ which extends around the insulating members and the edges of which overlap at $f'$ so that they can be secured together by an adhesive or other suitable means. The insulating members are provided with the necessary recesses to permit the posts $e$ of the terminals to extend through the same. The insulating members also serve as additional means for holding the heating members in operative relation between adjacent tubes.

The fluid is admitted to and discharged from the heater through the medium of suitable end members G which in the construction shown are provided with threaded tubular projections $g$ adapted to connect with a fluid conducting pipe and these end members are secured to the headers B by means of bolts $g'$ or the like. The end members are preferably so formed as to provide the spaces $g^2$ for the fluid and, in the construction shown, the end members are also provided with suitable brackets $g^3$ preferably formed integral therewith and adapted to be used for securing the heater to any suitable wall or support $g^4$. H represents a substantially cylindrical shell which is suitably secured to the end pieces G and which encloses the heater, the shell being preferably in the form of a sheet of material bent around the intermediate portion of the heater and removably held in place so that the shell may be taken off without interfering with any other parts of the heater. This shell may be of any other suitable construction or may be entirely omitted if desired.

The heater described has the advantage of being thoroughly efficient in operation owing to the intimate contact between the heating units or elements and the sides of the flat tubes. The arrangement of the heating elements or units between the tubes makes it possible to use flat tubes of comparatively thin metal without danger of having the fluid pressure damage the same and the fact that the tubes are made of thin metal makes it possible to more readily heat the fluid therein and also to cause the fluid to readily press the sides of the flat tubes against the heating elements. The insulating members, as well as the shell H, are also arranged so that they can be readily removed so that access may be had to the tubes and heating members with very little trouble.

I claim as my invention:

1. In an electric heater for fluids, the combination of a plurality of lengths of flat metal tubes made of resilient material and arranged side by side to form a group, substantially flat electric heating elements adapted to be removably inserted between adjacent lengths of tubes, and brace members engaging the opposite sides of the groups of tubes to limit the expansion thereof, said tubes, when fluid under pressure is admitted thereto, expanding laterally to securely hold said elements in place therein and to facilitate the conducting of heat from said elements to the fluid.

2. In an electric heater for fluids, the combination of a plurality of lengths of flat metal tubes made of resilient material and arranged side by side to form a group, and substantially flat electric heating elements adapted to be removably inserted between adjacent lengths of tubes when the fluid in said tubes is not under pressure, said resilient tubes expanding when subjected to fluid pressure on the inside thereof to press the sides of said flat tubes toward said heating elements.

3. In an electric heater for fluids, the combination of a plurality of lengths of flat metal tubes through which the fluid may pass and arranged side by side, said tubes being made of yielding material and adapted to expand laterally, an electric heating unit between adjacent lengths of tubes, sheets of insulating material separating said heating units from said tubes, said heating units being readily removable from said heater when said tubes are in their normal positions, said tubes expanding laterally when fluid under pressure is admitted thereto to press the sides of said tubes toward said heating unit.

4. In an electric heater for fluids, the combination of end members adapted to be connected with a pipe for the fluid, a group of flat tubes connecting said end members and adapted to conduct fluid from one of said end members to the other end member, said tubes being spaced apart, flat heating units arranged between each adjacent pair of tubes, and a heat insulating covering surrounding said tubes and heating units said covering being made in two sections which are so formed as to adapt themselves to the shape of said group of tubes and which are removable to render said group of tubes accessible.

5. In an electric heater for fluids, the combination of a plurality of flat tubes through which the fluid may pass and the flat walls of which are bulged outwardly by fluid under pressure within the tubes, flat electric heating units arranged between the flat walls of adjacent tubes, and means engaging the outer tubes for limiting the extent to which said sides of the tubes may bulge out.

6. In an electric heater for fluids, the combination of end members adapted to be connected with a pipe for the fluid, a group of flat tubes connecting said end members and adapted to conduct fluid from one of said end members to the other end member, said tubes being spaced apart, flat heating units arranged between each adjacent pair of tubes, a heat insulating covering surrounding said tubes and heating units and having detachable parts which when removed from the heater afford access to all of the heating units, and terminals extending through said covering and to which said units are connected.

7. In an electric heater for fluids, the combination of a plurality of flat tubes through which the fluid may pass and which are made of flexible material, said tubes being arranged side by side, and heating units arranged between adjacent tubes, whereby the pressure of the fluid in said tubes will press said tubes against said heating units.

8. In an electric heater for fluids, the combination of a plurality of flat tubes through which the fluid may pass and which are made of thin metal, said tubes being arranged side by side, flat heating units arranged between adjacent tubes, and flat insulating strips arranged between said heating units and said tubes, whereby the pressure of fluid in said tubes presses the tubes against said insulating material and heating units.

9. In an electric heater for fluids, the combination of a plurality of flat tubes through which the fluid may pass and which are made of flexible material, said tubes being arranged side by side, heating units arranged between adjacent tubes, whereby the pressure of the fluid in said tubes will press said tubes against said heating units, and means for holding the outer walls of the outer tubes against distortion.

10. In an electric heater for fluids, the combination of a plurality of flat tubes through which the fluid may pass and which are made of flexible material, said tubes being arranged side by side, heating units arranged between adjacent tubes, whereby the pressure of the fluid in said tubes will press said tubes against said heating units, headers to which the ends of said tubes are connected, and truss members engaging said headers and extending lengthwise of the flat outer walls of the outer tubes to hold said walls against distortion.

11. In an electric heater for fluids, the combination of a plurality of flat metal tubes through which the fluid may pass, headers to which the ends of the tubes are secured, the portions of said tubes between said headers being spaced apart, means for forming a water tight connection between said headers and said tubes, said tubes being made of relatively thin flexible material, heating units arranged in the spaces between adjacent tubes, reinforcing members connecting said headers and holding the outer walls of the outer tubes against lateral expansion, whereby the pressure of the fluid will press the walls of the tubes against the heating units.

12. In an electric heater for fluids, the combination of a plurality of flat tubes through which the fluid may pass and which are made of flexible material, said tubes being arranged side by side, heating units arranged between adjacent tubes, whereby the pressure of the fluid in said tubes will press said tubes against said heating units, headers to which the ends of said tubes are connected and which have inwardly projecting parts, and truss members removably connected with said projecting parts and extending lengthwise of the flat outer walls of the outer tubes to hold said walls against distortion.

13. In an electric heater for fluids, the combination of a plurality of flat tubes through which the fluid may pass and which have portions which are spaced apart, heating units arranged in the spaces between tubes, said heating units comprising an electrical conductor wound around a substantially flat piece of insulating material, and sheets of insulating material separating said tubes and said heating units.

14. In an electric heater for fluids, the combination of a plurality of flat metal tubes through which the fluid may pass and which have their end portions expanded, whereby the tubes when arranged side by side will form spaces between adjacent pairs of tubes, headers to which the expanded ends of said tubes are secured to form water tight connections therewith, and electric heating units arranged in the spaces between adjacent tubes.

CARL T. PENTON.